C. FREDERICK.
ERASER HOLDER.
APPLICATION FILED SEPT. 15, 1908.
931,405.
Patented Aug. 17, 1909.
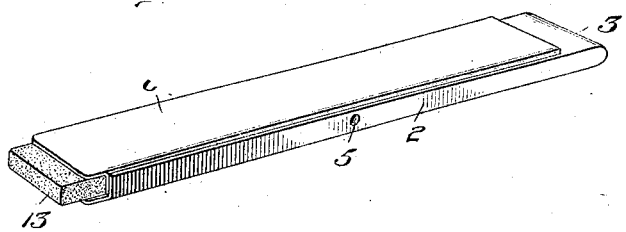
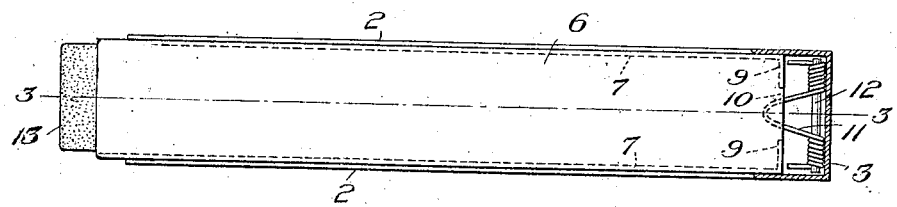
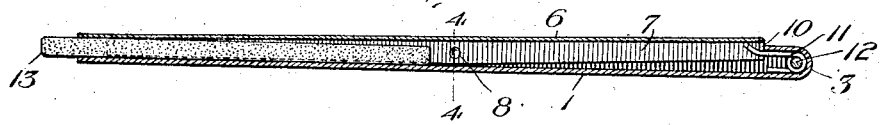
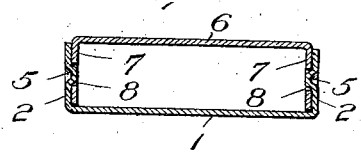
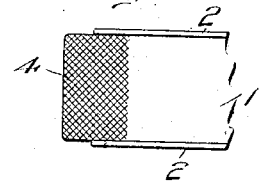
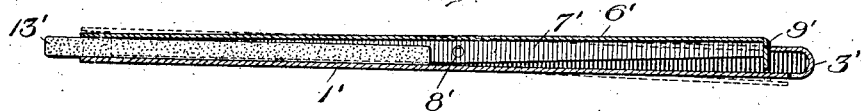
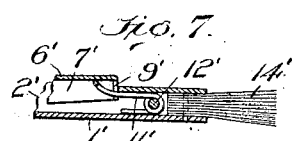
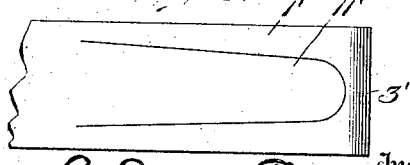

UNITED STATES PATENT OFFICE.

CHARLES FREDERICK, OF COLUMBIANA, OHIO.

ERASER-HOLDER.

No. 931,405.   Specification of Letters Patent.   Patented Aug. 17, 1909.

Application filed September 15, 1908. Serial No. 453,099.

*To all whom it may concern:*

Be it known that I, CHARLES FREDERICK, a citizen of the United States, residing at Columbiana, in the county of Columbiana and State of Ohio, have invented certain new and useful Improvements in Eraser-Holders; and I do hereby declare the following to be a full, clear, and exact description of the invention, such as will enable others skilled in the art to which it appertains to make and use the same.

My invention relates to articles of stationery and has particular reference to erasers and to eraser holders, and has for its object the production of a compact inexpensive and durable eraser-holder or casing for containing a suitable strip of rubber or other abrading material, for protecting the latter from exposure when not in use, for rendering it more cleanly, effective and economical in its action, and for avoiding the necessity of actual contact with the hand of the user.

The invention also contemplates and includes certain structural features and combination of parts which will be hereinafter described and particularly pointed out in the claims.

In the accompanying drawings which form part of this application and whereon like numerals of reference indicate corresponding parts in the several views: Figure 1, represents in perspective my invention in its entirety equipped with a strip of erasing rubber in position for use. Fig. 2, is a plan view of same on an enlarged scale, the outer end being partly broken away affording an interior view of that point. Fig. 3, is a longitudinal central section on the line 3—3 Fig. 2. Fig. 4, is a transverse central section on the line 4—4 Fig. 3. Fig. 5, is a fragmentary plan view of one clamping jaw. Fig. 6, is a longitudinal central section of a modified form of the invention. Fig. 7, is a fragmentary sectional view of a modification involving the addition of a brush at the outer end of the holder, and Fig. 8, is a fragmentary inverted plan view of the outer end of modification shown by Fig. 6.

Reference being had to the drawings and numerals thereon, 1 indicates the body or trough-shaped member preferably of relatively thin sheet metal having angular sides 2, 2, a curved outer end 3 folded upon itself as best shown by Fig. 3, and a roughened inner surface 4 at its operative end as indicated by Fig. 5. At a point intermediate of the extremities of body 1, its sides 2, 2 are provided with inwardly projecting oppositely arranged pintles 5, 5 punched up from, and therefore integral with, the metal itself for purposes that will hereinafter appear.

The numeral 6 indicates the opposite or inclosing member of the eraser-holder or casing, provided at its operative end with a roughened inner surface corresponding and adapted to coöperate with, the like surface 4, in body 1 aforesaid, and provided also with inturned angular sides 7, 7 adapted to nest within the sides 2, 2 of said body 1 as shown by Figs. 2 and 4. These sides 7, 7 at points intermediate their extremities are perforated as at 8, 8 to receive the pintles 5, 5 aforesaid whereby body 1 and the inclosing member 6 are pivotally connected; and, as best shown by Fig. 3, the depth of said sides 7, 7 is gradually reduced from their centers to their opposite ends for the purpose of facilitating a rocking or pivotal movement. At its outer extremity the member 6 is partially closed by a down turned end 9 broken as at 10 to permit the introduction of a spring 11 coiled upon a supporting shaft 12 and housed within the folded outer end 3 of body 1 as clearly shown by Fig. 2.

Within the confines of body 1 and the inclosing member 6 is removably located the strip of rubber or other abrading material 13 as shown by Figs. 1, 2, 3 and modified Fig. 6. Preferably this is in the form of a rectangular strip of rubber snugly fitting the eraser-holder, where in practice it is securely retained by engagement of the roughened inner faces 4, 4 of body 1 and top or closure 2, being there held in operative position by action of spring 11 the constant pressure whereof beneath the opposite or outer end of said member 6 tends to rock the latter upon its pivotal bearings 5, 8 as indicated.

Obviously as the erasing material 13 becomes worn it may be released by pressure of the outer end of closure 6 upon its opposing spring 11, whereupon said erasing material may be fed down into its operative position, Fig. 3 illustrating the material partially used.

Within the spirit of my invention the structure may be variously modified as, for example, in Figs. 6, 8, the spring 11' may be struck up from the underside of body 1', while the extreme outer inturned end 9' of the top closure 6' may be slightly extended to rest in close proximity to the inner surface of said modified form of spring. If now pressure be applied to the outer end of said top closure 6' its extremity 9' depresses the modified spring 11' whereupon all parts assume the position indicated by dotted lines in Fig. 6 to unclamp or release the rubber 13'. Likewise if desired a dusting brush 14' may be added as shown by Fig. 7, for which purpose the end 3' of the body 1' is opened the brush being inserted therein and secured in any approved manner.

Having thus described my invention what I claim and desire to secure by Letters-Patent is:

1. In an eraser holder the combination with a bottom member having oppositely arranged angular sides, a top member having corresponding sides within the first named sides, an embossed pivotal connection between each pair of adjacent sides, a spring interposed between said top and bottom members at a point remote from that of their pivotal connection to spread them at one end, and an eraser held between the opposing faces of said top and bottom members at the opposite side of their pivotal connection, substantially as described.

2. In an eraser-holder the combination with a bottom member having oppositely arranged angular sides and an end loosely folded upon itself, a top member having corresponding sides within the first named sides tapered toward opposite ends, an embossed pivotal connection between each pair of adjacent sides, a spring located within the folded end of said bottom member to spread the top and bottom members at this point; and an eraser held between the opposite ends of said top and bottom members, substantially as described.

In testimony whereof I affix my signature, in presence of two subscribing witnesses.

CHARLES FREDERICK.

Witnesses:
 S. S. WESSER,
 A. C. BELL.